(12) United States Patent
Thompson

(10) Patent No.: US 6,698,468 B1
(45) Date of Patent: Mar. 2, 2004

(54) FUEL OVERFLOW CATCH

(76) Inventor: Chadwick W. Thompson, 507 Calcite Cove, Round Rock, TX (US) 78681

( * ) Notice: Subject to any disclaimer, the term of this patent is extended or adjusted under 35 U.S.C. 154(b) by 0 days.

(21) Appl. No.: 10/259,986

(22) Filed: Sep. 30, 2002

(51) Int. Cl.[7] .............................. B65B 1/04; B65B 3/04; B67C 3/02
(52) U.S. Cl. .......................... 141/86; 141/88; 141/331; 141/390; 141/391
(58) Field of Search ............................. 141/86, 87, 88, 141/297–300, 331–345, 390–392; 184/106; 222/108–111; 137/312–314

(56) References Cited

U.S. PATENT DOCUMENTS 4,013,105 A * 3/1977 Uuskallio .................... 141/86
5,571,249 A * 11/1996 Boylen .......................... 141/86
6,289,946 B1 * 9/2001 Davies .......................... 141/86

* cited by examiner

*Primary Examiner*—Timothy L. Maust

(57) ABSTRACT

A fuel overflow catch for preventing spillage of gasoline on a motorcycle gas tank includes a bowl member having a bottom wall and a peripheral wall that is attached to and extends upwardly from the bottom wall. The bottom wall has an opening extending therethrough. An exit conduit is fluidly attached to and extends through the bottom wall. The exit conduit is positioned generally adjacent to the peripheral wall. A hose has a first end and a second end. The first end is fluidly coupled to the exit conduit. The second end of the hose is fluidly coupled to a housing for receiving overflowing gasoline.

7 Claims, 2 Drawing Sheets

FUEL OVERFLOW CATCH

BACKGROUND OF THE INVENTION

1. Field of the Invention

The present invention relates to anti-spill devices and more particularly pertains to a new anti-spill device for enabling a user to collect and contain any fuel that happens to accidentally overflow during the refueling process of a motorcycle. The gasoline could be directed back down into the tank do it does not ruin the wax or cause the bike's paint to peel.

2. Description of the Prior Art

The use of anti-spill devices is known in the prior art. U.S. Pat. No. 3,967,660 describes a fuel overflow device for boats for minimizing gasoline spillage during fueling of a boat. Another type of anti-spill device is U.S. Pat. No. 5,878,795 describing a fuel spill collector device for connection between a fuel line and a fuel fill fitting. U.S. Pat. No. Des. 363,501 describes an anti-spill fluid receptacle. Other related patents include U.S. Pat. No. 4,234,098, U.S. Pat. No. 5,074,343, and U.S. Pat. No. 4,600,041.

While these devices fulfill their respective, particular objectives and requirements, the need remains for a device that utilizes a collection device that collects fuel overflow form the main tank.

SUMMARY OF THE INVENTION

The object of the present invention is to provide a new anti-spill device that would prevent the user from inadvertently damaging the fuel tank from repeated accidental overflows while refueling.

Another object of the present invention is to provide a new anti-spill device that would collect and contain the gasoline for release back into the tank.

To this end, the present invention generally comprises a bowl member having a bottom wall and a peripheral that is attached to and extends upwardly from the bottom wall. The bottom wall has an opening extending therethrough. An exit conduit is fluidly attached to and extends through the bottom wall. The exit conduit is positioned generally adjacent to the peripheral wall. A hose has a first end and a second end. The first end is fluidly coupled to the exit conduit. The second end of the hose is fluidly coupled to a housing for receiving overflowing gasoline.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
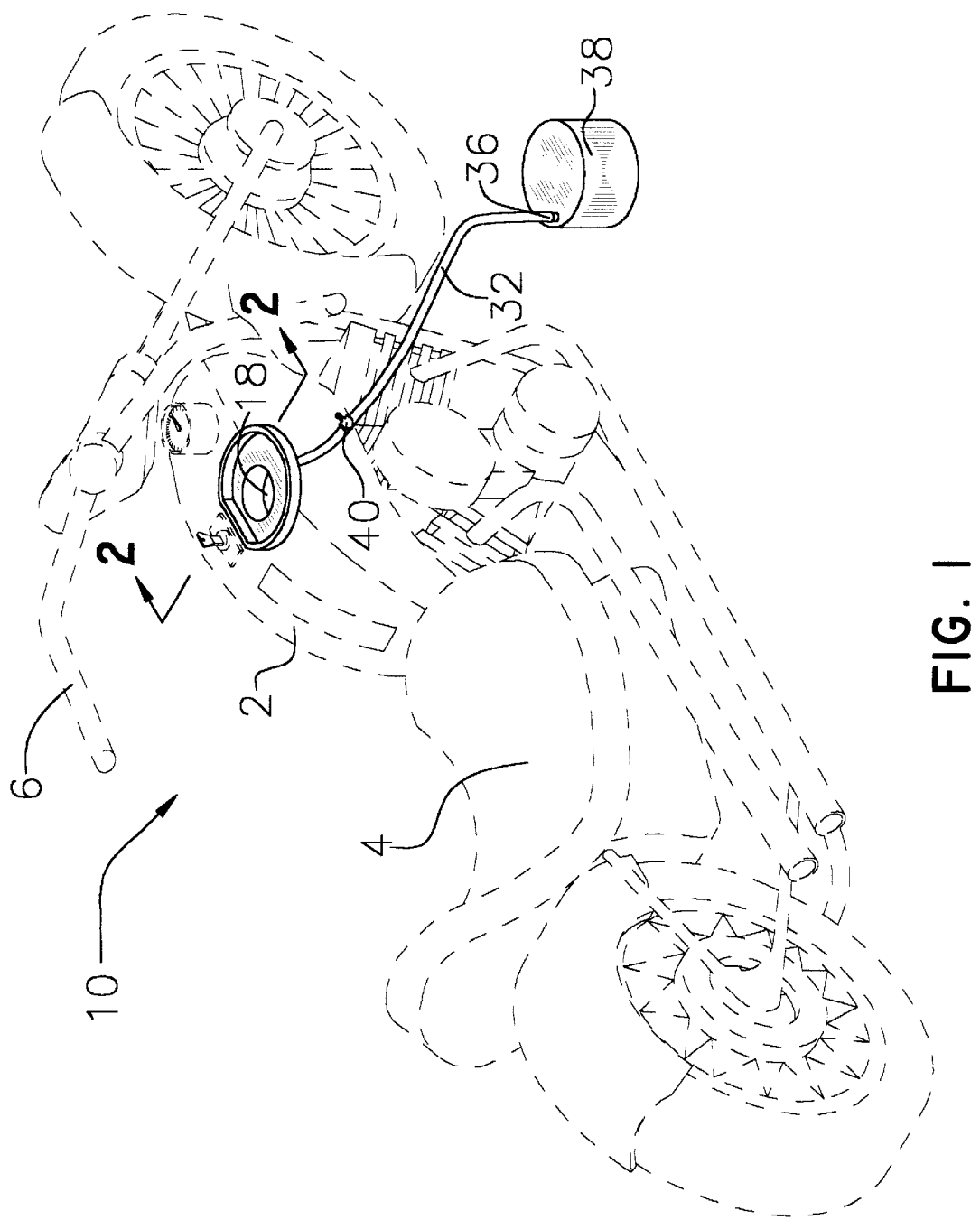
FIG. 1 is a perspective view of a fuel overflow catch according to the present invention.
Figure 2:
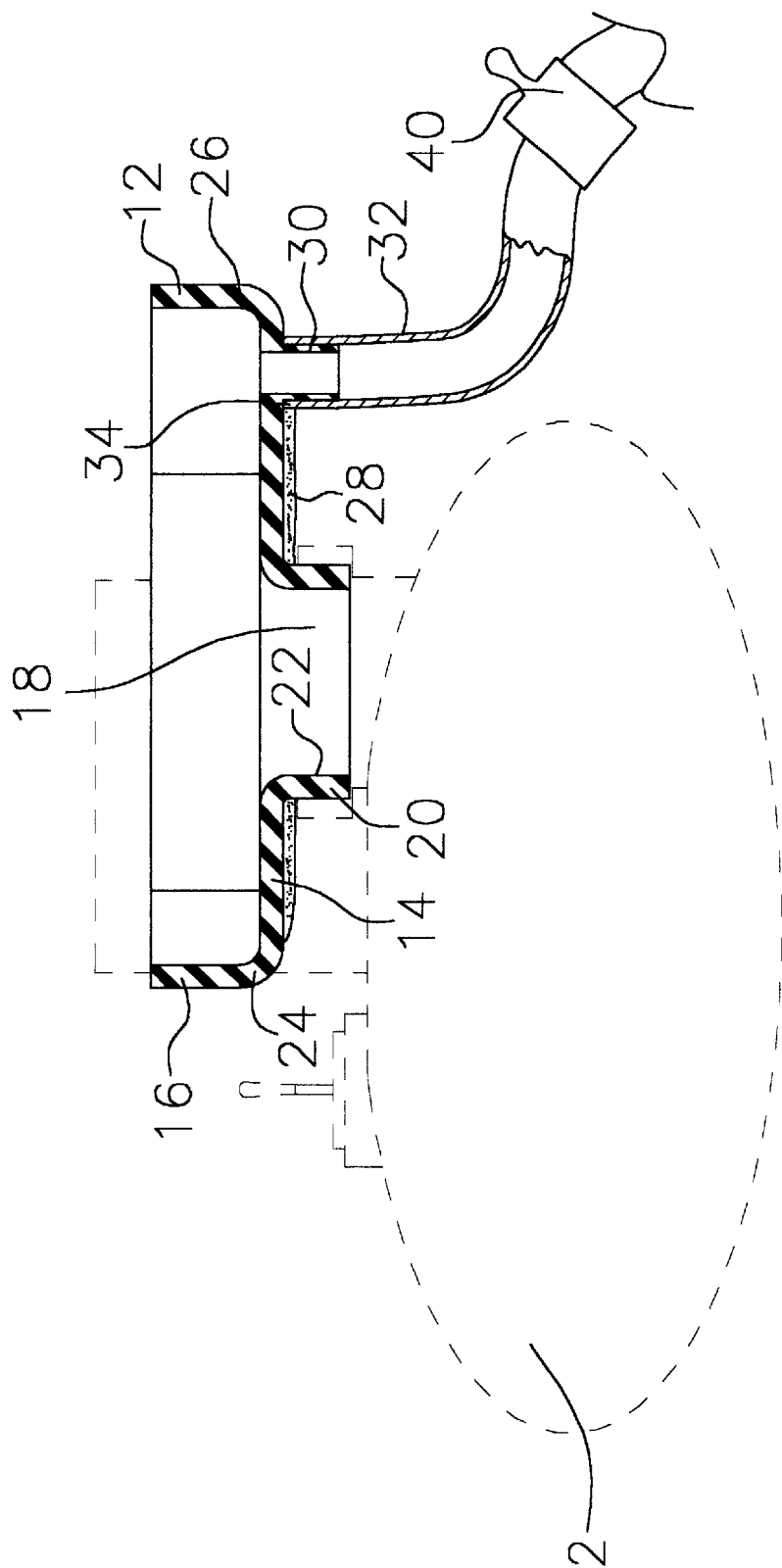
FIG. 2 is a cross-sectional view taken along the line 2—2 of FIG. 1 of the present invention.

With reference now to the drawings, and in particular to FIGS. 1 and 2 thereof, a new anti-spill devices embodying the principles and concepts of the present invention and generally designated by the reference numeral 10 will be described.

As best illustrated in FIGS. 1 and 2, the fuel overflow catch 10 generally comprises a gas overflow catch and container combination device for a preventing the overflow of gasoline onto a gas tank 2 of a motorcycle 4. The device comprises a bowl member 12 having a bottom wall 14 and a peripheral wall 16 that is attached to and extends upwardly from the bottom wall 14. The bottom wall 14 has an opening 18 extending therethrough. A peripheral lip 20 is attached to an edge 22 of the opening 18 and extends downward therefrom. The opening 18 is centrally located in the bottom wall 14. The peripheral wall 16 has an arcuate portion 24 and a generally planar portion 26. The planar portion 26 is positioned adjacent to the handlebars 6 of a motorcycle 4 to ensure that the device will fit properly on the gas tank 2.

Ideally, a cushioning material 28 is attached to the bottom wall 14. The cushioning material 28 preferably comprises a cotton material though any soft or resiliently compressible material (such as an elastomer) may be used. The cushioning material 28 ensures that the device will not scratch the paint of the tank 2.

An exit conduit 30 is fluidly attached to and extends through the bottom wall 14. The exit conduit 30 is positioned generally adjacent to the peripheral wall 16. A hose 32 has a first end 34 and a second end 36. The first end 34 is fluidly coupled to the exit conduit 30. The second end 36 of the hose 32 is fluidly coupled to a housing 38 for receiving overflowing gasoline. The gasoline may be removed from the housing 38 by pouring it out through the first end 34 of the hose 32, which is removable from the exit conduit 30. Ideally, a closing member 40 is positioned on the hose 32 for selectively opening and closing the hose 32. The closing member 40 may be a clip for pinching the hose closed or a conventional valve.

In use, the peripheral lip 20 is positioned in the opening 18 of the gasoline tank 2 of the motorcycle 4. Fuel is poured through the opening 18 the bottom wall 14. If the fuel overflows, it is caught in the bowl member 12 and exits through the exit conduit 30 and into the housing 38. The device prevents gas from contacting the outer surface of the gas tank 2 so that it does not damage the paint or finish of the tank 2.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gas overflow catch and container combination device for a preventing the overflow of gasoline onto the gas tank of a motorcycle, said device comprising:

a bowl member having a bottom wall and a peripheral wall being attached to and extending upwardly from said bottom wall, said bottom wall having an opening extending therethrough, a peripheral lip being attached to an edge of said opening and extending downward therefrom;

an exit conduit being fluidly attached to and extending through said bottom wall, said exit conduit being positioned generally adjacent to said peripheral wall;

a hose having a first end and a second end, said first end being fluidly coupled to said exit conduit;

a cushioning material being attached to said bottom wall; and a housing for receiving overflowing gasoline, said second end of said hose being fluidly coupled to said housing.

2. The gas overflow catch and container combination device as in claim 1, wherein said opening is centrally located in said bottom wall.

3. The gas overflow catch and container combination device as in claim 1, a closing member being positioned on said hose for selectively opening and closing said hose.

4. A gas overflow catch and container combination device for a preventing the overflow of gasoline onto the gas tank of a motorcycle, said device comprising:

a bowl member having a bottom wall and a peripheral wall being attached to and extending upwardly from said bottom wall, said bottom wall having an opening extending therethrough, a peripheral lip being attached to an edge of said opening and extending downward therefrom;

an exit conduit being fluidly attached to and extending through said bottom wall, said exit conduit being positioned generally adjacent to said peripheral wall;

a hose having a first end and a second end, said first end being fluidly coupled to said exit conduit, a closing member being positioned on said hose for selectively opening and closing said hose; and a housing for receiving overflowing gasoline, said second end of said hose being fluidly coupled to said housing.

5. The gas overflow catch and container combination device as in claim 4, wherein said opening is centrally located in said bottom wall.

6. The gas overflow catch and container combination device as in claim 5, further including a cushioning material being attached to said bottom wall.

7. The gas overflow catch and container combination device as in claim 4, further including a cushioning material being attached to said bottom wall.

* * * * *